United States Patent
Chen

(10) Patent No.: US 11,334,572 B2
(45) Date of Patent: May 17, 2022

(54) METHOD AND DEVICE FOR DISPLAYING QUERY RESULTS BASED ON DEEP QUESTION AND ANSWER

(71) Applicant: Beijing Baidu Netcom Science And Technology Co., Ltd., Beijing (CN)

(72) Inventor: Yanfeng Chen, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 992 days.

(21) Appl. No.: 15/649,090

(22) Filed: Jul. 13, 2017

(65) Prior Publication Data

US 2018/0181574 A1 Jun. 28, 2018

(30) Foreign Application Priority Data

Dec. 27, 2016 (CN) ............... 201611224370.9

(51) Int. Cl.
*G06F 16/2457* (2019.01)
*G06F 16/35* (2019.01)
*G06F 16/9535* (2019.01)
*G06N 20/00* (2019.01)

(52) U.S. Cl.
CPC ...... *G06F 16/24578* (2019.01); *G06F 16/355* (2019.01); *G06F 16/358* (2019.01); *G06F 16/9535* (2019.01); *G06N 20/00* (2019.01)

(58) Field of Classification Search
CPC ............. G06F 16/24578; G06F 16/355; G06F 16/358; G06F 16/9535; G06N 20/00
See application file for complete search history.

(56) References Cited

U.S. PATENT DOCUMENTS

| 8,762,368 | B1* | 6/2014 | Duddu | G06F 16/285 |
| | | | | 707/722 |
| 9,189,550 | B2* | 11/2015 | Edgar | G06F 16/951 |
| 9,507,858 | B1* | 11/2016 | Lerner | G06F 16/38 |
| 2002/0184267 | A1* | 12/2002 | Nakao | G06F 16/345 |
| | | | | 715/255 |

(Continued)

FOREIGN PATENT DOCUMENTS

| CN | 104063497 A | * | 9/2014 |
| CN | 104063497 A | | 9/2014 |

OTHER PUBLICATIONS

Chinese Patent Application No. 201611224370.9 Office Action dated Aug. 15, 2019, 7 pages.

(Continued)

*Primary Examiner* — Hosain T Alam
*Assistant Examiner* — Anthony G Gemignani
(74) *Attorney, Agent, or Firm* — Lathrop GPM LLP

(57) ABSTRACT

The present disclosure provides a method and device for displaying query results based on deep question and answer, in which the method includes: receiving a query, in which the query is a preset type query in a preset field; obtaining short viewpoints of aggregation results corresponding to the query, in which each of the aggregation results is obtained by aggregating webpages where viewpoint sentences from a same viewpoint cluster are located, and a short viewpoint of each of the aggregation results is obtained according to viewpoint sentences from a corresponding viewpoint cluster; and displaying the short viewpoints of the aggregation results.

9 Claims, 5 Drawing Sheets

(56) References Cited

U.S. PATENT DOCUMENTS

| | | | | |
|---|---|---|---|---|
| 2008/0256069 A1* | 10/2008 | Eder | .................... | G06Q 90/00 |
| 2010/0030769 A1* | 2/2010 | Cao | .................... | G06F 16/338 |
| | | | | 707/738 |
| 2011/0112995 A1* | 5/2011 | Chang | .................... | G06N 20/00 |
| | | | | 706/12 |
| 2013/0124439 A1* | 5/2013 | Yamamoto | ............ | G06F 40/295 |
| | | | | 706/12 |
| 2013/0173264 A1* | 7/2013 | Kiss | ................... | G10L 25/63 |
| | | | | 704/231 |
| 2014/0354768 A1* | 12/2014 | Mei | .................... | H04N 5/235 |
| | | | | 348/36 |
| 2016/0021114 A1* | 1/2016 | Lu | .................... | H04L 61/1552 |
| | | | | 726/1 |
| 2016/0092791 A1* | 3/2016 | Moghaddam | ......... | G06F 16/355 |
| | | | | 706/12 |

OTHER PUBLICATIONS

Chinese Patent Application No. 201611224370.9 English translation of Office Action dated Aug. 15, 2019, 7 pages.

\* cited by examiner

METHOD AND DEVICE FOR DISPLAYING QUERY RESULTS BASED ON DEEP QUESTION AND ANSWER

CROSS-REFERENCE TO RELATED APPLICATION

The present application is based upon and claims priority to Chinese Patent Application No. 201611224370.9, filed on Dec. 27, 2016, the entire contents of which are incorporated herein by reference.

FIELD

The present disclosure relates to an internet technology field, and more particularly to a method and a device for displaying query results based on deep question and answer.

BACKGROUND

Deep question and answer means a technology which can understand human languages, intelligently identify meanings of a question and extract an answer to the question from a huge number of internet data.

In related art, when a user performs a medical query, a search engine can provide many webpages to the user, and the user has to click these webpages one by one to obtain information therein. Further, when there are different viewpoints in the answers, the user may need a long time to read and compare to obtain a desired answer. In the above situations, search efficiency of the user is low, and user experience is poor.

SUMMARY

Embodiments of the present disclosure seek to solve at least one of the problems existing in the related art to at least some extent.

For this, one objective of the present disclosure is to provide a method for displaying query results based on deep question and answer, which can improve search efficiency of the user and promote user experience.

Another objective of the present disclosure is to provide a device for displaying query results based on deep question and answer.

To achieve above objectives, embodiments of a first aspect of the present disclosure provide a method for displaying query results based on deep question and answer, including: receiving a query, in which the query is a preset type query in a preset field; obtaining short viewpoints of aggregation results corresponding to the query, in which each of the aggregation results is obtained by aggregating webpages where viewpoint sentences from a same viewpoint cluster are located, and a short viewpoint of each of the aggregation results is obtained according to viewpoint sentences from a corresponding viewpoint cluster; and displaying the short viewpoints of the aggregation results.

To achieve above objectives, embodiments of a second aspect of the present disclosure provide a device for displaying query results based on deep question and answer, including: a receiving module, configured to receive a query, in which the query is a preset type query in a preset field; an obtaining module, configured to obtain short viewpoints of aggregation results corresponding to the query, in which each of the aggregation results is obtained by aggregating webpages where viewpoint sentences from a same viewpoint cluster are located, and a short viewpoint of each of the aggregation results is obtained according to viewpoint sentences from a corresponding viewpoint cluster; a first displaying module, configured to display the short viewpoints of the aggregation results.

The present disclosure further provides an apparatus, including: one or more processors; a storage for storing one or more programs; in which the one or more programs are executed by the one or more processors, the one or more processors are configured to perform any of the methods according to embodiments of the first aspect of the present disclosure.

The present disclosure further provides a non-transitory computer-readable storage medium, having stored therein one or more programs that, when executed by one or more processors of an apparatus, cause the one or more processors to perform any of the methods according to embodiments of the first aspect of the present disclosure.

The present disclosure further provides a program product that, when executed by one or more processors of an apparatus, causes the one or more processors to perform any of the methods according to embodiments of the first aspect of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
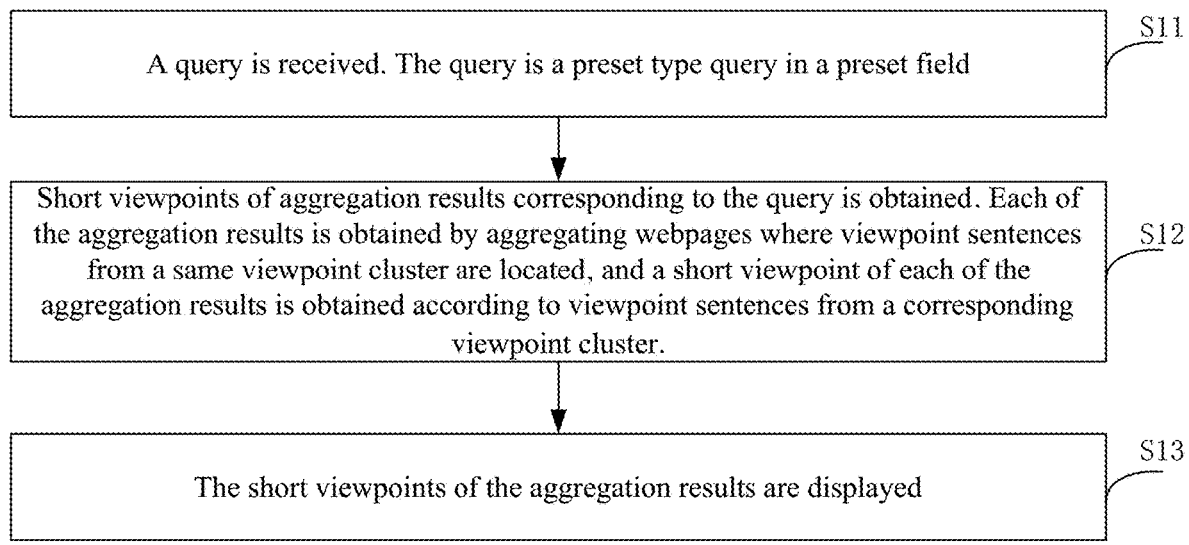
FIG. 1 is a flow chart of a method for displaying query results based on deep question and answer according to an embodiment of the present disclosure.

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure. Instead, the embodiments of the present disclosure comprise all the variants, modifications and their equivalents within the spirit and scope of the present disclosure as defined by the claims.

FIG. 1 is a flow chart of a method for displaying query results based on deep question and answer according to an embodiment of the present disclosure.

As shown in FIG. 1, the method according to the embodiment includes following.

In step S11, a query is received. The query is a preset type query in a preset field.

For example, a user may enter the query in a form of speech, text, or the like in a client. Then the client may send the query entered by the user to a search engine, such that the search engine can receive the query sent by the client.

After the search engine receives the query sent by the client, the search engine may first judge whether the query is the preset type query in the preset field. When a judgment result indicates that the query is the preset type query in the preset field, subsequent processes may be executed, otherwise, a common search process is performed.

For example, the preset field may be the medical field, the preset type may include "how to do", "why", "symptom", or the like.

Specifically, whether the query is the preset type query in the preset field may be judged with a method of character string matching. For example, a dictionary of the medical field may be preset, if the query contains a word the same or similar as one in the dictionary, it indicates that the query is a query in the preset field. In addition, if the query contains words belonging to the preset type mentioned above, for example, contains words such as "how to do", "why", "symptom", or an approximate word thereof, it indicates that the query is a query of the preset type.

In step S12, short viewpoints of aggregation results corresponding to the query are obtained.

Each of the aggregation results is obtained by aggregating webpages where viewpoint sentences from a same viewpoint cluster are located, and a short viewpoint of each of the aggregation results is obtained according to viewpoint sentences from a corresponding viewpoint cluster.

After the search engine determines that the query is the preset type query in the preset field, the search engine may first obtain webpages corresponding to the query, and then process the webpages to obtain the aggregation results and short viewpoints thereof. A short viewpoint is a passage of text for representing an aggregation result, and the number of words contained in the passage of text is less than a preset value, such as less than 20 words.

With regard to specific content of the search engine obtaining the aggregation results and the short viewpoints thereof, reference may be made to following description.

In step S13, the short viewpoints of the aggregation results are displayed.

After the search engine obtains the aggregation results and the short viewpoints thereof, the search engine can sent the aggregation results and the short viewpoints thereof to the client, thus the short viewpoints can be displayed to the user by the client.

Figure 2:
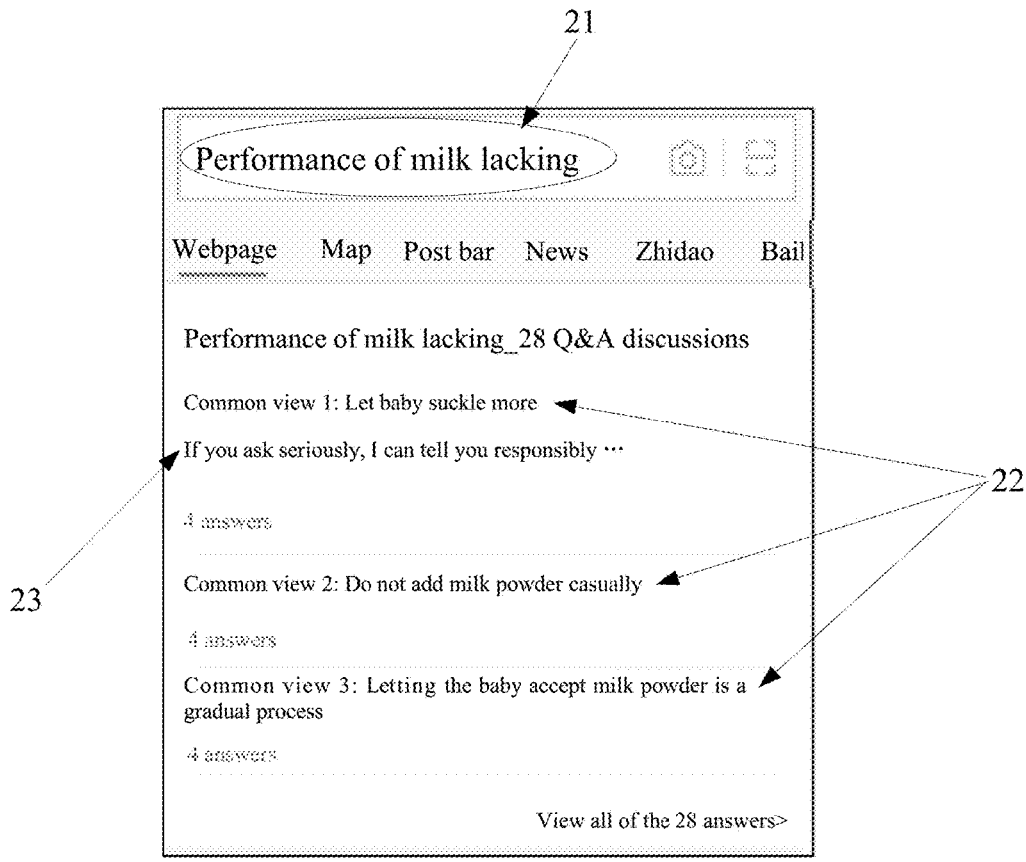
FIG. 2 is a schematic diagram of a displaying effect of query results in an embodiment of the present disclosure.

FIG. 2 provides a schematic diagram of a displaying effect of query results. As shown in FIG. 2, after the user enters the query 21, the search engine may obtain a plurality of aggregation results corresponding to the query 21, and determine a short viewpoint for each of the aggregation results. Then the short viewpoint of each of the aggregation results may be sent to the client by the search engine, and displayed by the client. As shown in FIG. 2, the client may display short viewpoints 22 of a plurality of aggregation results to the user.

Further, after an aggregation result is obtained, summary information may be generated according to the short viewpoint of the aggregation result, and summary information is displayed according to the corresponding aggregation result. In a specific implementation, summary information corresponding to each of the aggregation results may be displayed, or summary information corresponding to a part of the aggregation results may be displayed. For example, as shown in FIG. 2, summary information 23 corresponding to a first aggregation result is displayed.

When generating the summary information according to a short viewpoint, such as when obtaining a file segment where the short viewpoint is located, the file segment is combined with a beginning of a paragraph where the file segment is located to form the summary information.

Figure 3:
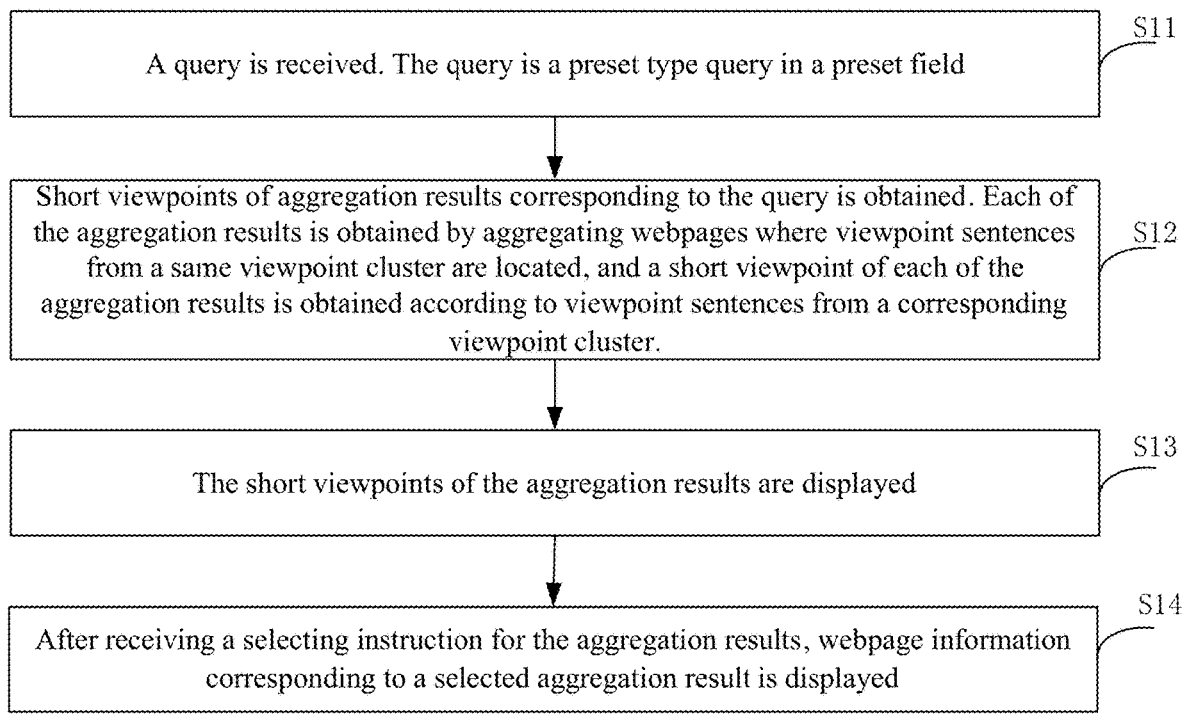
FIG. 3 is a flow chart of a method for displaying query results based on deep question and answer according to another embodiment of the present disclosure.

In some embodiments, as shown in FIG. 3, the method for displaying query results based on deep question and answer further includes followings.

In step S14, after receiving a selecting instruction for the aggregation results, webpage information corresponding to a selected aggregation result is displayed.

The short viewpoint of each of the aggregation results may be located at a clickable display item. When the user click a clickable display item where a short viewpoint of a certain aggregation result is located, it indicates that the user selects the aggregation result corresponding to the display item, then webpage information corresponding to the selected aggregation result may be displayed.

Figure 4:
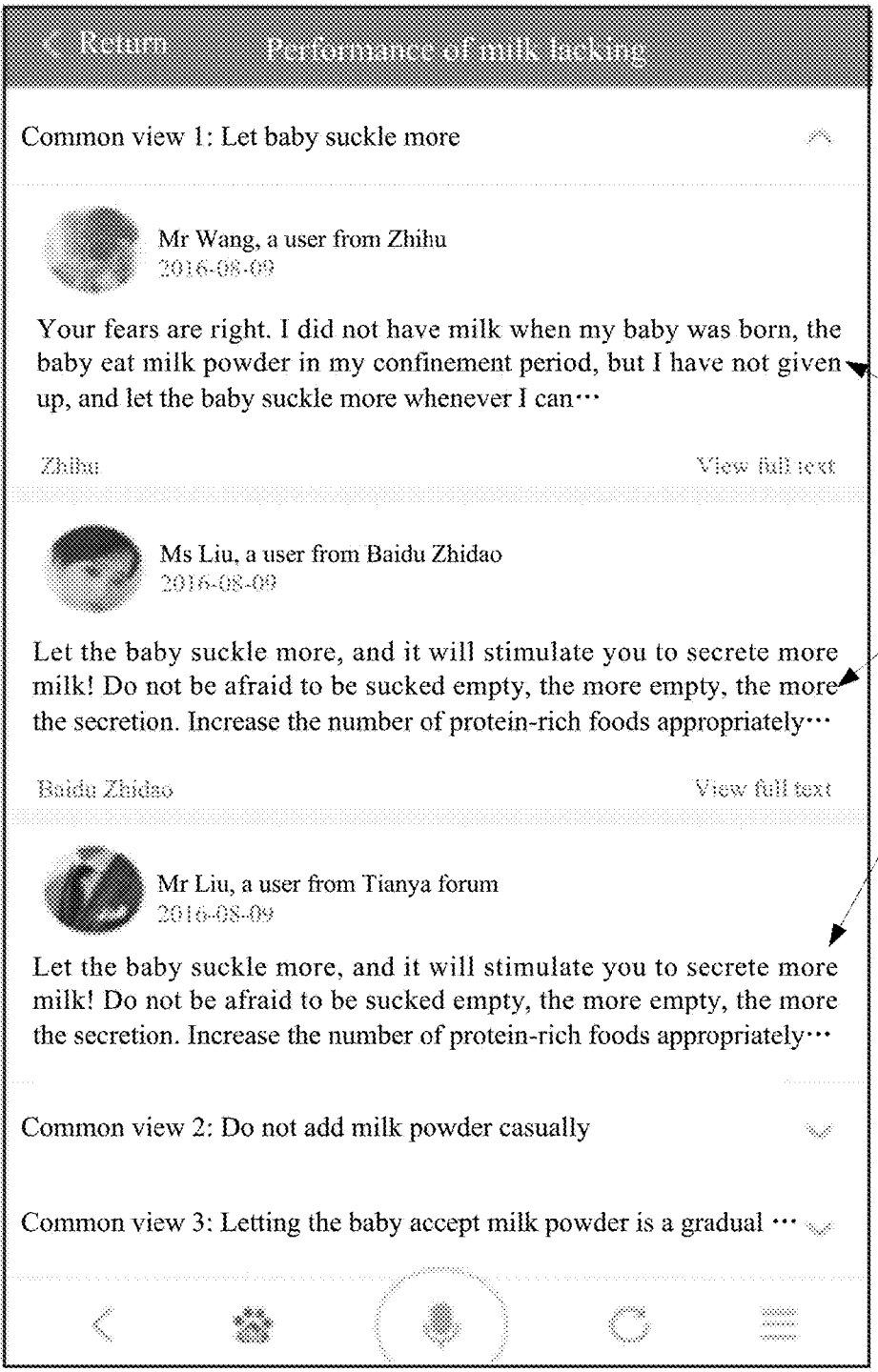
FIG. 4 is a schematic diagram of displaying effect after a user selects an aggregation result in an embodiment of the present disclosure.

For example, after the user clicks a display item corresponding to "common viewpoint 1" shown in FIG. 2, a page shown in FIG. 4 may be displayed, which contains webpage information 41 corresponding to "common viewpoint 1", i.e., information of a webpage where viewpoint sentences in a viewpoint cluster to which "common viewpoint 1" belongs are located.

In this embodiment, by obtaining and displaying the short viewpoints of the aggregation results corresponding to the query, the webpages can be aggregated, and the short viewpoints can be extracted from the webpages, thereby improving search efficiency of the user, and improving user experience.

Figure 5:
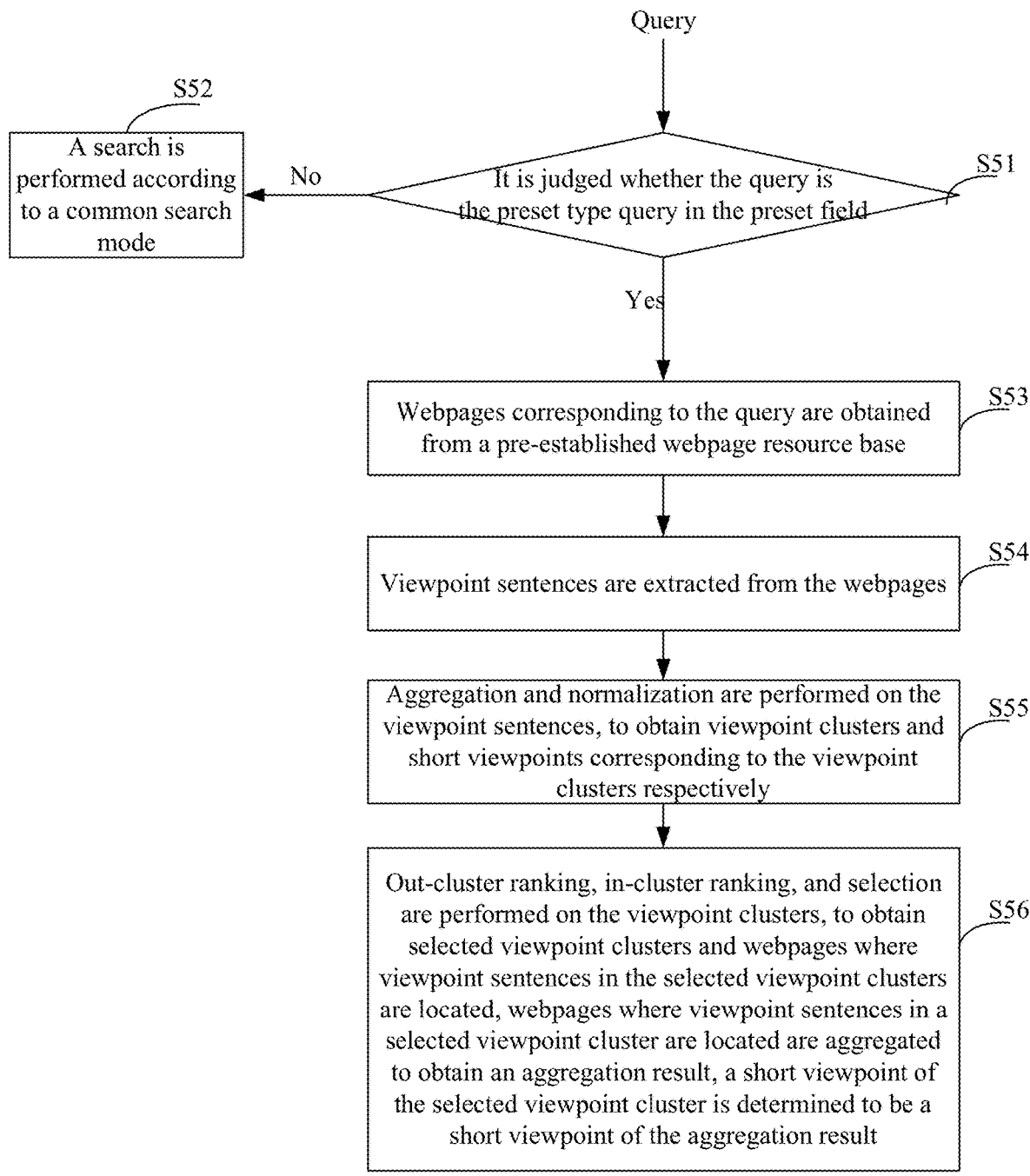
FIG. 5 is a flow chart of a method for obtaining short viewpoints of aggregation results corresponding to the query according to another embodiment of the present disclosure.

FIG. 5 is a flow chart of a method for obtaining short viewpoints of aggregation results corresponding to the query according to an embodiment of the present disclosure.

As shown in FIG. 5, the method according to this embodiment includes followings.

In step S51, the received query is identified, and it is judged whether the query is the preset type query in the preset field.

If the query is the preset type query in the preset field, step S53 and its subsequent steps are executed, otherwise, step S52 is executed.

For example, the preset field is the medical field, the preset type includes "how to do", "why", "symptom", or the like.

Specifically, a method of character string matching can be used. For example, a dictionary in the medical field is preset, if the query contains a word the same or similar as one in the dictionary, it indicates that the query is a query in the preset field. In addition, if the query contains words of the above types, such as "how to do", "why", "symptom", or the like, or an approximate word thereof, it indicates that the query is a query of the preset type query.

In step S52, a search is performed according to a common search mode.

For example, webpages corresponding to the query are obtained, and pieces of information of the webpages are displayed one by one on a search result page.

In step S53, webpages corresponding to the query are obtained from a pre-established webpage resource base.

In this embodiment, the webpage resource base includes two parts. A first part is a universal webpage resource base, i.e. the webpage resource base used during the existing search. The first part is the same as the webpage resource base used in common search.

A second part is a vertical type webpage resource base in the preset field.

For example, the second part is a vertical type webpage resource base in the medical field.

The second part can obtain high quality data by cooperating with a related resource party.

In the two parts, the first part is a webpage base for traditional search, advantages of which are that webpage resources are rich, and the webpage rank formed by clicking and adjusting in a long term by the user may ensure quality of the top one. However disadvantages of the first part are that, compared to the vertical type webpage resource base, some high quality resources cannot be ranked by structured information, thus resulting in that some high quality resource are actually ranked in the bottom. The vertical type webpage resource base of the second part can introduce high quality data by the cooperation. By applying the above two parts of webpage resource base, both quantity and quality of resource can be ensured.

Further, for webpages of the second part, short viewpoints of the webpages can be extracted offline, and be recorded in a search library ranked in a positive sequence, thus reducing time for online extracting short viewpoints and improving system efficiency.

In step S54, viewpoint sentences are extracted from the webpages.

Taking the query in the medical field as an example, different types of queries usually correspond to different viewpoint sentences. For example, for queries of a type such as "how to do", corresponding viewpoint sentences are usually action guiding sentences such as "try feeding the baby some Medilac-Vita" and "take more exercise". For queries of a type such as "why", corresponding viewpoint sentences are usually "because of eating too much", "a cold caused by cold weather", or directly a disease word, such as "a cold". For queries of a type such as "symptom", corresponding viewpoint sentences are usually specific symptoms of diseases, which can be judged easily with a symptom dictionary.

When the viewpoint sentences are extracted from webpages, the viewpoint sentences can be extracted based on machine learning.

Specifically, for each webpage, sentence segmentation is performed on the webpage to obtain sentences in the webpage. After that, it is judged whether a sentence is a short sentence. For example, a sentence with a number of words less than a preset value can be determined as a short sentence. Then it is judged whether the short sentence is a viewpoint sentence based on the machine learning, thus the viewpoint sentences in the webpages are obtained. The sentence which is not a short sentence can be determined as a non-viewpoint sentence without performing subsequent judgment.

A classifier can be used when judging whether a short sentence is a viewpoint sentence. For example, a classifier corresponding to each type of queries can be established. For example, "how to do" corresponds to a classifier, "why" corresponds to a classifier, and "symptom" corresponds to a classifier. After that, a classifier corresponding to the type to which the query belongs is selected. Characteristics of the short sentence are extracted. The extracted characteristics are taken as inputs of the selected classifier, and an output of the selected classifier is a confidence coefficient of the short sentence. The confidence coefficient is usually a value ranging from 0 to 1. If a confidence coefficient is larger than a preset value, it indicates that the short sentence corresponding to the confidence coefficient is a viewpoint sentence.

The classifier corresponding to each type of queries can be established in advance by training. For example, answer sentences corresponding to each type of queries are collected, each of the answer sentences is labeled for indicating whether the answer sentence is a viewpoint sentence, characteristics of the answer sentences are extracted, and a classifier of a corresponding type is generated by training according to the extracted characteristics and labeled results.

For questions of "how to do" type, sentence pattern is usually action guiding type, therefore, mainly used characteristics include a combination of an adjacent verb and a noun, a combination of an adjective and a verb, a combination of an adverb and a verb, some templates (such as "suggest (.+?)" or the like), a combination of a weak template and a following verb (because a single match of "more (.+?)$" may bring a lot of noise, but by combining with an adjacent verb, such as "more"+"exercise", the noise is reduced significantly), n-gram characteristics, the first word in a sentence, the last word in a sentence, whether context being a directive sentence, some object fronting combinations, and the like. "Suggest (.+?)" and "more (.+?)$" above represent regular expression matching, certainly, other matching method can be used.

For questions of "why" type, according to of sentence pattern characteristics, mainly used characteristics include a template characteristic (such as "why", "lead to", and the like), whether context being a directive sentence, n-gram characteristics, the first word in a sentence, the last word in a sentence, some hit disease words, matching information with a dictionary of common disease causes mined offline, question and answer correlation calculation based on word2vec, or other characteristics.

For questions of "symptom", most of the answers are nouns. Therefore, the method mainly uses symptom dictionary matching and symptom templates. A method for mining symptom dictionary offline mainly offline processes a large amount of data by using some symptom templates, such as "having a symptom of (.+?)", and performs word segmentation and statistics on hit part of the symptom templates, to obtain dictionary with a lot of symptom words.

In step S55, aggregation and normalization are performed on the viewpoint sentences, to obtain viewpoint clusters and short viewpoints corresponding respectively to the viewpoint clusters.

A collection of viewpoints of internet users is expected to be displayed to the user, and the viewpoints of internet users in raw webpages are same, but texts of the viewpoints are different, therefore, aggregation and normalization are necessary.

A method of the aggregation is a thought of hierarchical clustering. Similarities between the viewpoint sentences are firstly computed, and clustering is performed based on the similarities. And then, clusters with a same key word are merged based on the key word of each of the clusters obtained by the clustering. Each merged cluster is taken as a viewpoint cluster. When computing a similarity, two values can be computed respectively based on word vectors of words and phrase vectors of phrases contained in the viewpoint sentence, and a maximum value of the two values are configured as the similarity, thus recalling similar content as much as possible. The key word of each of the clusters can be determined according to term frequency-inverse document frequency (TF-IDF for short) of words in the cluster. For example, a word having a maximum TF-IDF value in a cluster is taken as a key word of the cluster. The TF value is local information, representing a frequency of occurrence of a word in a certain cluster, and the IDF value is global information, which may be determined according to information of all clusters.

A purpose of the normalization is to select a viewpoint with a well statement to represent a whole cluster. A method for the normalization judges whether a boundary of each of the viewpoint sentences in a viewpoint cluster is smooth and whether there are some redundant parts in each of the viewpoint sentences. If there is no well viewpoint sentence in the viewpoint cluster, existing viewpoint sentences can be processed, for example, removing redundant modal auxiliary words or other components, thus content with smooth boundary and without a redundant part is taken as a short viewpoint of the viewpoint cluster. Whether a boundary of a sentence is smooth is mainly judged according to a sentence pattern template. For example, if the sentence matches the sentence pattern template, it indicates that the boundary of the sentence is smooth. For example, the sentence pattern template is "suggest . . . ", if a sentence is "suggest to you to drink water", it indicates that the boundary of the sentence is smooth. Or else, if a sentence is "I personally suggest to you to drink water", it indicates that the boundary of the sentence is not smooth. Redundant part can be judged by determining whether a sentence contains a redundant word, i.e., if the sentence contains a redundant word, it indicates that the sentence has redundant part. The redundant words can be preset, for example some modal auxiliary words "ah", "hum", or the like may be considered as redundant words.

After a short viewpoint of a viewpoint cluster is obtained, filtration can be performed on original viewpoint sentences in the viewpoint cluster. For example, the similarity between each original viewpoint sentence and the short viewpoint is calculated, and an original viewpoint sentence corresponding to a similarity which is smaller than a preset value is removed, thus remaining viewpoint sentences are used for subsequent calculation. By the filtration, it is ensured that a viewpoint sentence in the viewpoint cluster and the short viewpoint are similar semantically.

In step S56, out-cluster ranking, in-cluster ranking, and selection are performed on the viewpoint clusters, to obtain selected viewpoint clusters and webpages where viewpoint sentences in the selected viewpoint clusters are located, webpages where viewpoint sentences in a selected viewpoint cluster are located are aggregated to obtain an aggregation result and a short viewpoint of the selected viewpoint cluster is determined to be a short viewpoint of the aggregation result.

After the above viewpoint clusters are obtained, out-cluster ranking can be firstly performed, i.e., a ranking is performed on the viewpoint clusters. An algorithm of the ranking can be set, for example, according to a number of viewpoint sentences contained in each of the viewpoint clusters, a confidence coefficient of each of the viewpoint clusters, whether information content being contained in each of the viewpoint clusters, or the like. After the ranking is performed on the viewpoint clusters, a preset number of viewpoint clusters ranked ahead can be selected as selected viewpoint clusters.

After the selected viewpoint clusters are obtained, a ranking can be performed on webpages where viewpoint sentences in each of the selected viewpoint clusters are located. An algorithm of the ranking can be set. For example, if a webpage contains questions and answers of an authoritative expert, or the webpage is provided by a website with a high quality, the webpage is ranked ahead. After the ranking is performed on webpages, a preset number of webpages ranked ahead can be selected as selected webpages. The preset number corresponding to the viewpoint clusters and the preset number corresponding to the webpages are independent from each other, which can be same or different.

After selected webpages corresponding to each of the viewpoint clusters are obtained, these selected webpages corresponding to a viewpoint cluster can be aggregated to obtain an aggregation result, and the short viewpoint of the viewpoint cluster can be regarded as a short viewpoint of a corresponding aggregation result.

As above, the search engine can obtain the aggregation results and the short viewpoint of each of the aggregation results, after that, the short viewpoint of each of the aggregation results can be sent to the client by the search engine, and displayed to the user by the client. Therefore, the user can see short information after aggregation and extraction, thus improving search efficiency and promoting user experience. Further, after the user selects one of the aggregation results, webpage information corresponding to the aggregation result selected by the user can be sent to the client by the search engine, and displayed to the user by the client. After that, the user can view more detailed webpage information corresponding to each short viewpoint as needed.

Figure 6:
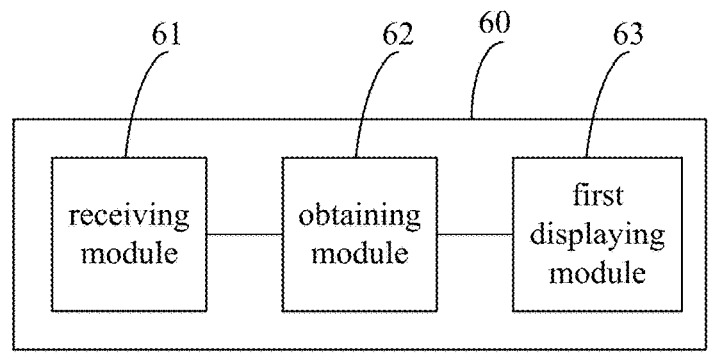
FIG. 6 is a block diagram of a device for displaying query results based on deep question and answer according to an embodiment of the present disclosure.

FIG. 6 is a block diagram of a device for displaying query results based on deep question and answer according to an embodiment of the present disclosure.

As shown in FIG. 6, the device 60 according to this embodiment includes a receiving module 61, an obtaining module 62, and a first displaying module 63.

The receiving module 61 is configured to receive a query, in which the query is a preset type query in a preset field.

The obtaining module 62 is configured to obtain short viewpoints of aggregation results corresponding to the query, in which each of the aggregation results is obtained by aggregating webpages where viewpoint sentences from a same viewpoint cluster are located, and a short viewpoint of each of the aggregation results is obtained according to viewpoint sentences from a corresponding viewpoint cluster.

The first displaying module 63 is configured to display the short viewpoints of the aggregation results.

Figure 7:
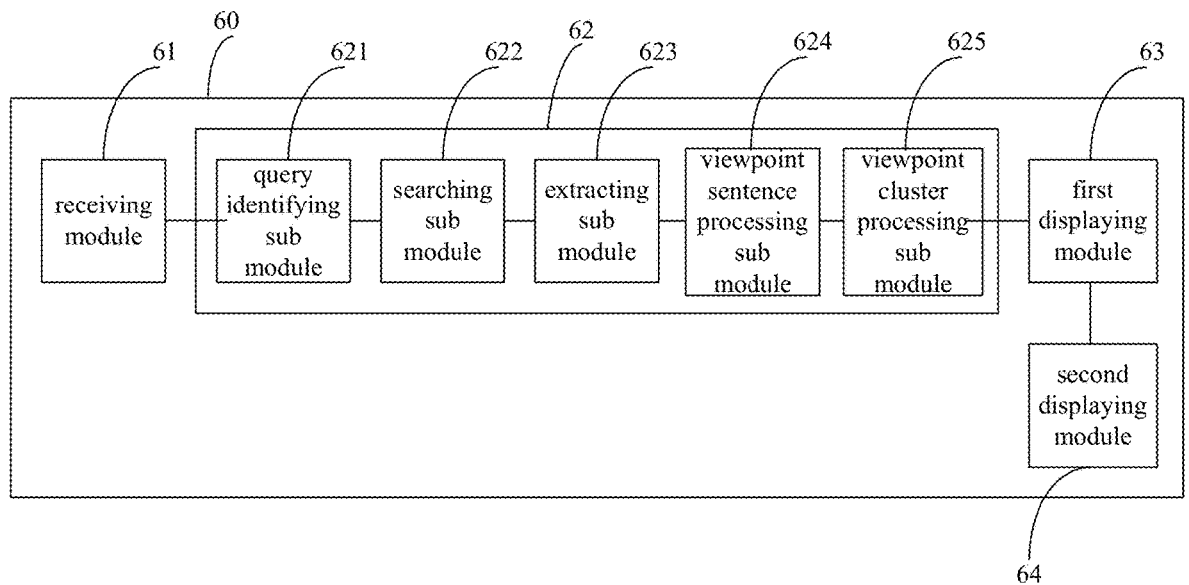
FIG. 7 is a block diagram of a device for displaying query results based on deep question and answer according to another embodiment of the present disclosure.

In some embodiments, as shown in FIG. 7, the device 60 further includes a second displaying module 64. The second displaying module 64 is configured to display webpage information corresponding to a selected aggregation result after receiving a selecting instruction for the aggregation results.

In some embodiments, as shown in FIG. 7, the obtaining module 62 includes a query identifying sub module 621, a searching sub module 622, an extracting sub module 623, a viewpoint sentence processing sub module 624, and a viewpoint cluster processing sub module 625.

The query identifying sub module 621 is configured to identify the query, and judge whether the query is the preset type query in the preset field, so as to trigger the searching sub module 622, the extracting sub module 623, the viewpoint sentence processing sub module 624, and the viewpoint cluster processing sub module 625 to work when the query is the preset type query in the preset field.

The searching sub module 622 is configured to obtain webpages corresponding to the query from a pre-established webpage resource base.

The extracting sub module 623 is configured to extract viewpoint sentences from the webpages.

The viewpoint sentence processing sub module 624 is configured to perform aggregation and normalization on the viewpoint sentences, to obtain viewpoint clusters and short viewpoints corresponding respectively to the viewpoint clusters.

The viewpoint cluster processing sub module 625 is configured to perform out-cluster ranking, in-cluster ranking, and selection on the viewpoint clusters to obtain selected viewpoint clusters and webpages where viewpoint sentences in the selected viewpoint clusters are located, aggregate webpages where viewpoint sentences in each of the selected viewpoint clusters are located to obtain an aggregation result, and determine a short viewpoint of each of the selected viewpoint clusters to be a short viewpoint of a corresponding aggregation result.

In some embodiments, the viewpoint cluster processing sub module 625 is further configured to generate summary information according to a short viewpoint of the aggregation result after obtaining the aggregation result, and the first displaying module 63 is further configured to display the summary information according to the aggregation result.

In some embodiments, the webpage resource base includes a universal webpage resource base and a vertical type webpage resource base in the preset field.

In some embodiments, the extracting sub module 623 is configured: to perform sentence segmentation on the webpages to obtain sentences in the webpages, if a sentence in the webpages is a short sentence, to judge whether the short sentence is a viewpoint sentence based on a machine learning, if the short sentence in the webpages is a viewpoint sentence, to determine the short sentence to be a viewpoint sentence of the webpages.

In some embodiments, the viewpoint sentence processing sub module 624 is configured to compute similarities between the viewpoint sentences, and to cluster the viewpoint sentences according to the similarities to obtain a plurality of clusters, to determine a key word for each of the clusters, merge clusters with a same key word, and take each merged cluster as a viewpoint cluster, and to perform normalization on viewpoint sentences in a viewpoint cluster to obtain a short viewpoint of the viewpoint cluster.

It should be understood that, the device of this embodiment corresponds to above method embodiments, with regard to detail content, reference may be made to the relative description of the method embodiments, which is not described in detail.

In this embodiment, by obtaining and displaying the short viewpoints of the aggregation results corresponding to the query, webpages can be aggregated and short viewpoints can be extracted from the aggregated results, thereby improving search efficiency and promoting user experience.

Embodiments of the present disclosure further provides an apparatus, including: one or more processors; a storage for storing one or more programs; in which the one or more programs are executed by the one or more processors, the one or more processors are configured to perform: receiving a query, in which the query is a preset type query in a preset field; obtaining short viewpoints of aggregation results corresponding to the query, in which each of the aggregation results is obtained by aggregating webpages where viewpoint sentences from a same viewpoint cluster are located, and a short viewpoint of each of the aggregation results is obtained according to viewpoint sentences from a corresponding viewpoint cluster; and displaying the short viewpoints of the aggregation results.

It should be understood that, if the apparatus is a terminal equipment on user side, the apparatus is configured to receive a query input by a user, to obtain short viewpoints of aggregation results corresponding to the query sent by a server, and to display the short viewpoints of the aggregation results. Alternatively, if the apparatus is an equipment on server side, the apparatus is configured to receive a query sent by a client, to obtain short viewpoints of aggregation results corresponding to the query, and to send the short viewpoints of the aggregation results to the client, to display the short viewpoints of the aggregation results through the client.

Embodiments of the present disclosure further provides a non-transitory computer-readable storage medium, having stored therein one or more programs that, when executed by one or more processors of an apparatus, cause the one or more processors to perform: receiving a query, in which the query is a preset type query in a preset field; obtaining short viewpoints of aggregation results corresponding to the query, in which each of the aggregation results is obtained by aggregating webpages where viewpoint sentences from a same viewpoint cluster are located, and a short viewpoint of each of the aggregation results is obtained according to viewpoint sentences from a corresponding viewpoint cluster; displaying the short viewpoints of the aggregation results.

Embodiments of the present disclosure further provides a program product that, when executed by one or more processors of an apparatus, causes the one or more processors to perform: receiving a query, in which the query is a preset type query in a preset field; obtaining short viewpoints of aggregation results corresponding to the query, in which each of the aggregation results is obtained by aggregating webpages where viewpoint sentences from a same viewpoint cluster are located, and a short viewpoint of each of the aggregation results is obtained according to viewpoint sentences from a corresponding viewpoint cluster; displaying the short viewpoints of the aggregation results.

It should be understood that, the same or similar parts in above mentioned embodiments maybe referred to each other, and the contents not described in some embodiments may refer to the same or similar contents in other embodiments.

It should be noted that, terms such as "first" and "second" are used herein for purposes of description and are not intended to indicate or imply relative importance or significance. Thus, the feature defined with "first" and "second" may comprise one or more this feature. In addition, in the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for displaying query results based on deep question and answer, comprising:
   receiving a query, wherein the query is a preset type query in a preset field;
   obtaining webpages corresponding to the query from a pre-established webpage resource base;
   performing sentence segmentation on the webpages to obtain sentences in the webpages;
   determining a sentence in the webpages is a short sentence in response to a number of words contained in the sentence being less than a preset number, and judging whether the short sentence is a viewpoint sentence based on machine learning, the judging comprising:
   extracting sentence pattern characteristics of the short sentence;
   inputting the extracted sentence pattern characteristics into a classifier corresponding to each type of queries which is established in advance by training, to obtain a confidence coefficient of the short sentence, wherein the classifier is established in advance by collecting answer sentences corresponding to each type of queries, labeling each of the answer sentences for indicating whether the answer sentence is a viewpoint sentence, extracting sentence pattern characteristics of the answer sentences, and training according to the extracted sentence pattern characteristics and labeled results; and
   determining the short sentence as the viewpoint sentence if the obtained confidence coefficient is larger than a preset value;
   performing aggregation and normalization on the viewpoint sentences, to obtain viewpoint clusters and short viewpoints corresponding respectively to the viewpoint clusters;
   performing out-cluster ranking, in-cluster ranking, and selection on the viewpoint clusters to obtain selected viewpoint clusters and webpages where viewpoint sentences in the selected viewpoint clusters are located, aggregating webpages where viewpoint sentences in each of the selected viewpoint clusters are located to obtain an aggregation result, and determining a short viewpoint of each of the selected viewpoint clusters to be a short viewpoint of a corresponding aggregation result; and
   displaying the short viewpoints of the aggregation results;
   wherein the webpage resource base comprises a universal webpage resource base and a vertical type webpage resource base in the preset field, and short viewpoints of the webpages from the vertical type webpage resource base are extracted offline;
   wherein the method further comprises: after obtaining the aggregation result, generating summary information by combining a file segment where a short viewpoint of the aggregation result is located with a beginning of a paragraph where the file segment is located, and displaying the summary information according to the aggregation result.

2. The method according to claim 1, further comprising:
   after receiving a selecting instruction for the aggregation results, displaying webpage information corresponding to a selected aggregation result.

3. The method according to claim 1, further comprising:
   identifying the query, and judging whether the query is the preset type query in the preset field.

4. The method according to claim 1, wherein performing aggregation and normalization on the viewpoint sentences, to obtain viewpoint clusters and short viewpoints corresponding respectively to the viewpoint clusters comprises:
   computing similarities between the viewpoint sentences, and clustering the viewpoint sentences according to the similarities to obtain a plurality of clusters;
   determining a key word for each of the clusters, merging clusters with a same key word, and taking each merged cluster as a viewpoint cluster; and
   performing normalization on viewpoint sentences in a viewpoint cluster to obtain a short viewpoint of the viewpoint cluster.

5. A device for displaying query results based on deep question and answer, comprising:
   one or more processors;

a memory storing instructions executable by the one or more processors;

wherein the one or more processors are configured to:

receive a query, wherein the query is a preset type query in a preset field;

obtain webpages corresponding to the query from a pre-established webpage resource base;

perform sentence segmentation on the webpages to obtain sentences in the webpages;

determine a sentence in the webpages is a short sentence in response to a number of words contained in the sentence being less than a preset number, and judge whether the short sentence is a viewpoint sentence based on machine learning, the judging comprising:

extracting sentence pattern characteristics of the short sentence;

inputting the extracted sentence pattern characteristics into a classifier corresponding to each type of queries which is established in advance by training, to obtain a confidence coefficient of the short sentence, wherein the classifier is established in advance by collecting answer sentences corresponding to each type of queries, labeling each of the answer sentences for indicating whether the answer sentence is a viewpoint sentence, extracting sentence pattern characteristics of the answer sentences, and training according to the extracted sentence pattern characteristics and labeled results; and determining the short sentence as the viewpoint sentence if the obtained confidence coefficient is larger than a preset value;

perform aggregation and normalization on the viewpoint sentences, to obtain viewpoint clusters and short viewpoints corresponding respectively to the viewpoint clusters;

perform out-cluster ranking, in-cluster ranking, and selection on the viewpoint clusters to obtain selected viewpoint clusters and webpages where viewpoint sentences in the selected viewpoint clusters are located, aggregating webpages where viewpoint sentences in each of the selected viewpoint clusters are located to obtain an aggregation result, and determining a short viewpoint of each of the selected viewpoint clusters to be a short viewpoint of a corresponding aggregation result; and display the short viewpoints of the aggregation results;

wherein the webpage resource base comprises a universal webpage resource base and a vertical type webpage resource base in the preset field, and short viewpoints of the webpages from the vertical type webpage resource base are extracted offline;

wherein the one or more processors are further configured to: generate summary information by combining a file segment where a short viewpoint of the aggregation result is located with a beginning of a paragraph where the file segment is located after obtaining the aggregation result and display the summary information according to the aggregation result.

6. The device according to claim 5, wherein the one or more processors are further configured to:

display webpage information corresponding to a selected aggregation result after receiving a selecting instruction for the aggregation results.

7. The device according to claim 5, wherein the one or more processors are further configured to:

identify the query, and judge whether the query is the preset type query in the preset field.

8. The device according to claim 5, wherein the one or more processors are configured to perform aggregation and normalization on the viewpoint sentences, to obtain viewpoint clusters and short viewpoints corresponding respectively to the viewpoint clusters by acts of:

computing similarities between the viewpoint sentences, and clustering the viewpoint sentences according to the similarities to obtain a plurality of clusters;

determining a key word for each of the clusters, merging clusters with a same key word, and taking each merged cluster as a viewpoint cluster; and performing normalization on viewpoint sentences in a viewpoint cluster to obtain a short viewpoint of the viewpoint cluster.

9. A non-transitory computer-readable storage medium having stored therein instructions that, when executed by a processor of a device, cause the processor to perform a method for displaying query results based on deep question and answer, the method comprising:

receiving a query, wherein the query is a preset type query in a preset field;

obtain webpages corresponding to the query from a pre-established webpage resource base;

perform sentence segmentation on the webpages to obtain sentences in the webpages;

determine a sentence in the webpages is a short sentence in response to a number of words contained in the sentence being less than a preset number, and judge whether the short sentence is a viewpoint sentence based on machine learning, the judging comprising:

extracting sentence pattern characteristics of the short sentence;

inputting the extracted sentence pattern characteristics into a classifier corresponding to each type of queries which is established in advance by training, to obtain a confidence coefficient of the short sentence, wherein the classifier is established in advance by collecting answer sentences corresponding to each type of queries, labeling each of the answer sentences for indicating whether the answer sentence is a viewpoint sentence, extracting sentence pattern characteristics of the answer sentences, and training according to the extracted sentence pattern characteristics and labeled results; and determining the short sentence as the viewpoint sentence if the obtained confidence coefficient is larger than a preset value;

perform aggregation and normalization on the viewpoint sentences, to obtain viewpoint clusters and short viewpoints corresponding respectively to the viewpoint clusters;

perform out-cluster ranking, in-cluster ranking, and selection on the viewpoint clusters to obtain selected viewpoint clusters and webpages where viewpoint sentences in the selected viewpoint clusters are located, aggregating webpages where viewpoint sentences in each of the selected viewpoint clusters are located to obtain an aggregation result, and determining a short viewpoint of each of the selected viewpoint clusters to be a short viewpoint of a corresponding aggregation result; and displaying the short viewpoints of the aggregation results;

wherein the webpage resource base comprises a universal webpage resource base and a vertical type webpage resource base in the preset field, and short viewpoints of the webpages from the vertical type webpage resource base are extracted offline;

wherein the method further comprises: after obtaining the aggregation result, generating summary information by combining a file segment where a short viewpoint of the aggregation result is located with a beginning of a paragraph where the file segment is located, and displaying the summary information according to the aggregation result.

* * * * *